United States Patent [19]

Schönherr

[11] Patent Number: 4,642,546
[45] Date of Patent: Feb. 10, 1987

[54] METHOD AND APPARATUS FOR OPERATING A LOAD SUPPLIED VIA AN INTERMEDIATE-LINK CONVERTER, ESPECIALLY AN ASYNCHRONOUS MACHINE, IN THE EVENT OF A NETWORK DISTURBANCE

[75] Inventor: Andreas Schönherr, Erlangen, Fed. Rep. of Germany

[73] Assignee: Siemens Aktiengesellschaft, Munich, Fed. Rep. of Germany

[21] Appl. No.: 671,906

[22] Filed: Nov. 16, 1984

[30] Foreign Application Priority Data

Nov. 21, 1983 [DE] Fed. Rep. of Germany ....... 3341952

[51] Int. Cl.⁴ ............................................. H02P 5/40
[52] U.S. Cl. .................................... 318/798; 318/806
[58] Field of Search .................................. 363/55–58; 318/798, 806

[56] References Cited

U.S. PATENT DOCUMENTS

| | | | |
|---|---|---|---|
| 3,887,860 | 6/1975 | Bernhardt et al. ..................... | 307/31 |
| 4,267,570 | 5/1981 | Braun .................................. | 363/138 |
| 4,409,533 | 10/1983 | Kawabata ........................... | 318/807 |
| 4,451,112 | 5/1984 | Hattori et al. ....................... | 318/806 |
| 4,471,419 | 9/1984 | Schneider et al. .................... | 363/37 |
| 4,475,150 | 10/1984 | D'Atre et al. ........................ | 318/806 |

*Primary Examiner*—David Smith, Jr.
*Attorney, Agent, or Firm*—Kenyon & Kenyon

[57] ABSTRACT

In order to maintain the flux in an asynchronous machine supplied by an intermediate-link converter in the event of a network disturbance, the converter is initially blocked at the beginning of the network disturbance. After the intermediate-link current has decayed, the timing of the free-running converter on the machine side and the ignition of two series-connected controlled rectifiers of the converter on the network side are effected. The flux still present in the machine induces in the stator circuit closed in this manner a machine current which is controlled by a supplemental current controller in an operation slightly on the generator side, whereby, at the expense of the kinetic energy of the synchronized machine, a current through the circuit is generated which is required for covering the dielectric losses and for maintaining the desired flux.

14 Claims, 6 Drawing Figures

METHOD AND APPARATUS FOR OPERATING A LOAD SUPPLIED VIA AN INTERMEDIATE-LINK CONVERTER, ESPECIALLY AN ASYNCHRONOUS MACHINE, IN THE EVENT OF A NETWORK DISTURBANCE

BACKGROUND OF THE INVENTION

The present invention relates to a method for operating a load supplied from an a-c network via an intermediate-link converter in the event of a network disturbance until the current in the intermediate link has decayed, especially wherein the load is an asynchronous machine. The invention also relates to apparatus for carrying out the method.

The invention is explained for the preferred case wherein an asynchronous machine is provided as the load. Other loads, however, also can be used which generate at the converter output a periodic countervoltage, the amplitude of which decays only slowly even if the converter is blocked.

If the a-c voltage of the supplying network which may have three or more phases throughout, break downs or if amplitude or frequency disturbances occur, the converter must be shut off so that no faulty commutations occur. The machine then is without current rapidly and the machine flux decays slowly (exponentially). When the power returns, however, an appreciable torque can be generated only if an appropriate flux with a suitable phase relative to the current is available.

If, upon reconnecting the network to the still running machine, the desired flux is to be built up again as quickly as possible, therefore the frequency at the machine-side output of the converter ("machine frequency") must correspond to the machine speed during the reconnect action. To this end, the machine frequency can be slaved to the machine speed during the interruption of the network via a tachometer. This requires, on the one hand, a tachometer and, on the other hand, problems can arise in the synchronized reconnection to the still excited machine at machine frequencies which are higher than the network frequency. Synchronized connection of the network is generally made more difficult by the circumstance that, after a disturbance, the network is initially asymmetrical and requires a certain amount of time to become symmetrical after the reconnection.

In addition, it is frequently undesirable that the machine flux decays steadily during the disturbance and can be built up again only after the network disturbance.

Other methods, in which, for instance, the machine is separated from the converter after the network interruption and is connected directly to the network, or in which the machine frequency is slowly increased starting from zero according to a ramp function until the frequency and the speed coincide, are frequently eliminated for technological reasons.

SUMMARY OF THE INVENTION

It is an object of the present invention to make available another method for bridging a network disturbance in the operation of such a load supplied via an intermediate link converter. For this purpose, the invention requires no tachometer and no direct connection of the machine to the network. Also synchronized connection of the converter to the returning network is possible with simple means. It is in particular achieved by the invention that the desired flux is largely preserved in the machine also during the operating disturbance.

These and other objects of the present invention are achieved by a method for operating an asynchronous machine coupled to an a-c supply network via an intermediate link converter in the event of a disturbance of the supply network, the converter comprising rectifier means coupled to the supply network, inverter means coupled to the asynchronous machine, the converter fired in a normal commutation cycle when there is no disturbance of the network, the inverter means and rectifier means being coupled by an intermediate d-c link, the method comprising the steps of:

inhibiting the normal commutation cycle of the converter until current in the intermediate d-c link has decayed;

timing the inverter means with a clock frequency signal, firing two series connected controlled rectifiers of the rectifier means coupled across the intermediate d-c link so that the asynchronous machine current can be increased by flowing through the intermediate d-c link and the two series-connected controlled rectifiers of the rectifier means, the clock frequency signal of the inverter means being slaved to a measured value of the machine frequency such that the machine current assumes a value required for maintaining a desired flux in the asynchronous machine; and synchronously coupling the rectifier means to the network after the end of the disturbance and resuming the normal commutation cycle of the converter.

Other objects, features and advantages of the present invention will be apparent from the description which follows.

BRIEF DESCRIPTION OF THE DRAWINGS

The invention will be explained in greater detail in the following detailed description with reference to the drawings, in which.

DETAILED DESCRIPTION

Figure 1:
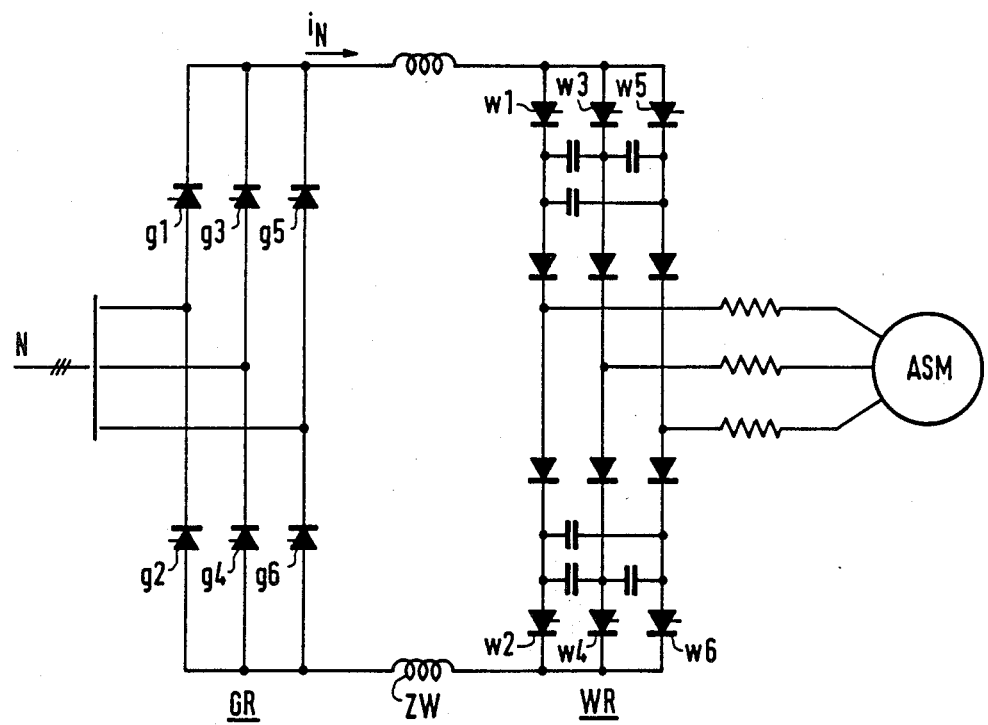
FIG. 1 shows an asynchronous machine ASM supplied, as a preferred example, with impressed intermediate-link current via an intermediate link converter.

With reference now to the drawings, FIG. 1 shows an intermediate link converter comprising a controlled network synchronized converter (rectifier GR), wherein the firing angle of the controlled rectifiers or valves is controlled in such a manner that the voltage in the intermediate d-c link ZW assumes that value which corresponds to the generation of a predetermined d-c current $i_N$. The drive zero corresponds to a controlled angle of 90° relative to the network voltage.

The intermediate-link d-c current is distributed to the terminals of the load by a free-running converter (inverter WR) with a machine frequency required to control the load. The controlled rectifiers W1 to W6 are advantageously supplemented according to FIG. 1 by commutating capacitors and diodes to form a phase-sequence inverter.

In the event of interruptions of the network N or other network disturbances, the intermediate link converter must be switched off so that no false commutations can occur. The machine ASM then is without current and, with the disappearance of the magnetizing current, the machine flux begins to decay exponentially and can practically become zero. With the machine unexcited, the flux must then be built up again first before the machine can develop a torque. The build-up of the flux, however, takes a relatively long time in accordance with the flux time constant. According to the invention, the flux is now maintained during the network failure. To this end it is necessary that the magnetizing current associated with the flux flows through the machine. Magnetizing current here is understood to mean the current which is required to maintain the flux at no-load. This magnetizing current can be considered as a vector rotating synchronously with the flux vector.

For generating this magnetizing current, suitable controlled rectifiers of the converter are fired when the magnitude and frequency of the magnetizing current can be predetermined by the control of the rectifiers, while the necessary energy for building up this current is taken from the kinetic energy of the still running machine. The machine is therefore "kinetically buffered", so to speak.

For this purpose, the converter is first blocked until the machine current and thereby, the intermediate link current, is reliably extinguished. As a rule this is the case after about 100 to 200 ms and can be monitored by a time delay stage into which the corresponding working time is firmly set.

Then, the clocking of the converter on the machine side (the inverter) is resumed with the machine speed, and a circuit is closed for the machine current via the intermediate link and two series-connected controlled rectifiers of the converter on the network side (the rectifier) so that the magnetizing current is now driven by the EMF of the machine. Thereby, the machine current required for the desired flux is built up again, the clock frequency of the converter on the machine side (inverter) being slaved to the machine frequency. The clock signal for the inverter WR, synchronous with the machine, can be derived from a terminal voltage of the machine. The flux then remains at the desired value if the machine frequency is controlled, after the clocking synchronous to the machine is resumed, with a frequency which is determined from the control deviation between the measured machine current and a specified machine current value derived from the machine frequency. The machine is controlled in slight generator operation and covers the losses produced in the machine and the converter. In particular, the supply voltage also can be provided by the machine voltage, which is required for the electrical components needed for controlling the method.

At the end of the network disturbance, i.e., if the network has returned to undisturbed operation, the converter on the network side now can be connected synchronously to the network. This connection is advantageously made when a symmetrical network is present again after a network disturbance. Current peaks and other transients upon connection to the returned undisturbed network can be avoided if the converter on the network side (rectifier) first is controlled to the drive zero and increased only then to the value which is desired for the specified current in undisturbed operation.

The invention now will be explained in greater detail, referring to an embodiment and the further drawing figures.

Figure 2:
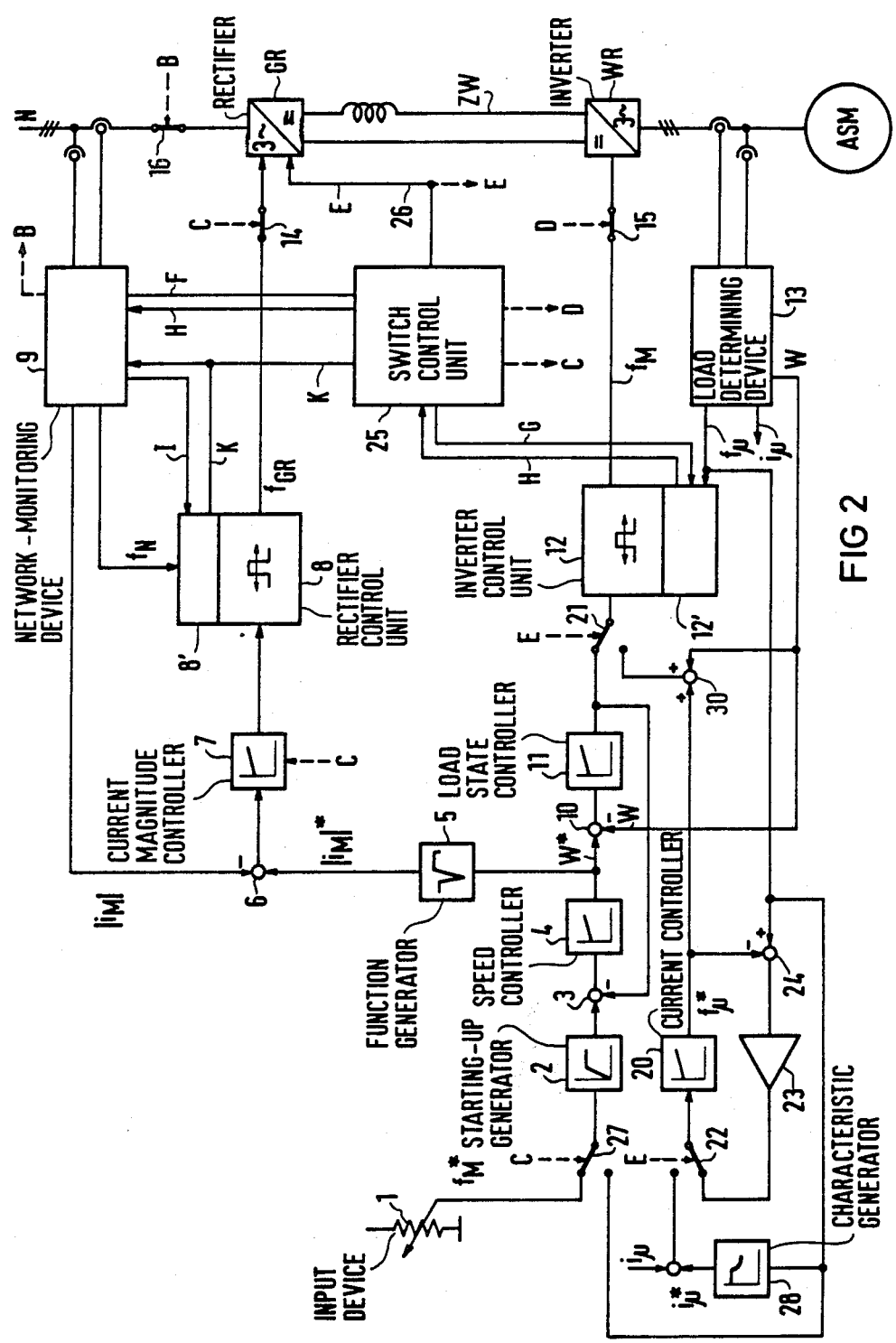
FIG. 2 is a block diagram of the control circuit for the converter of FIG. 1.
Figure 3:
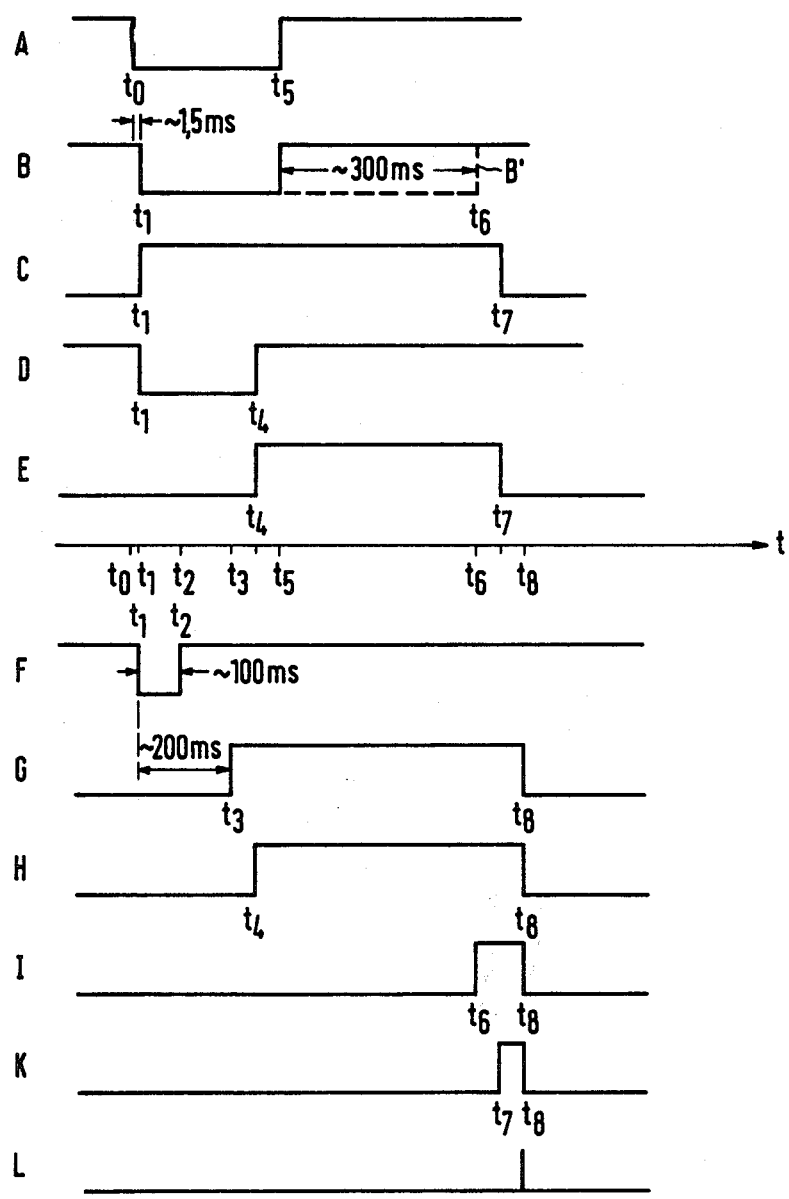
FIG. 3 is a timing diagram for signals in the diagram of FIG. 2.
Figure 4:
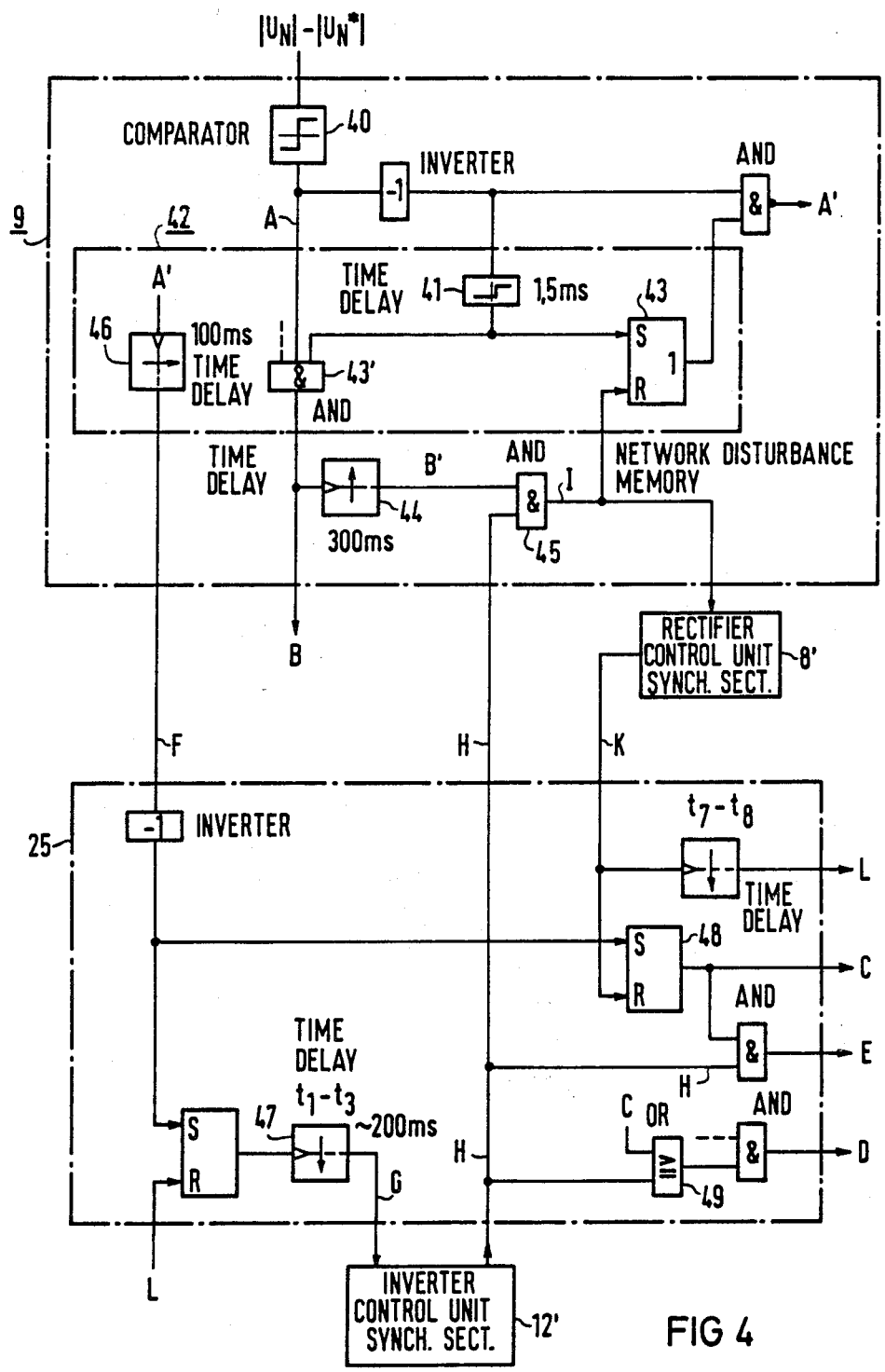
FIG. 4 is a block diagram of parts of the control circuit of FIG. 2.
Figure 5:
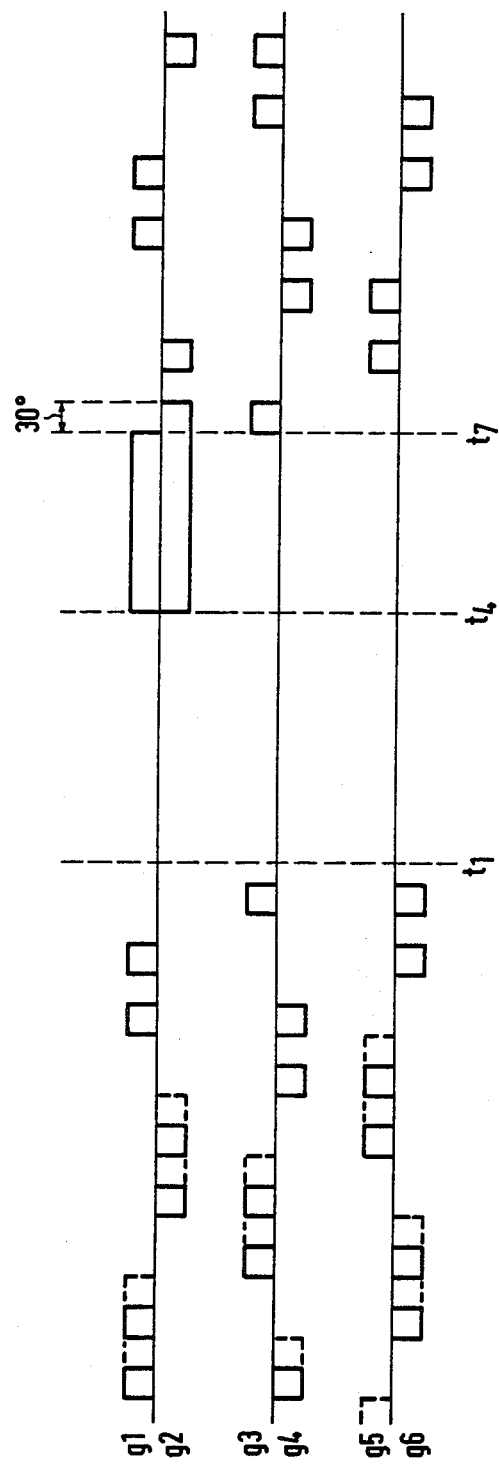
FIG. 5 is a timing diagram explaining the operation of the rectifier portion of the circuit shown in FIGS. 1 and 2.
Figure 6:
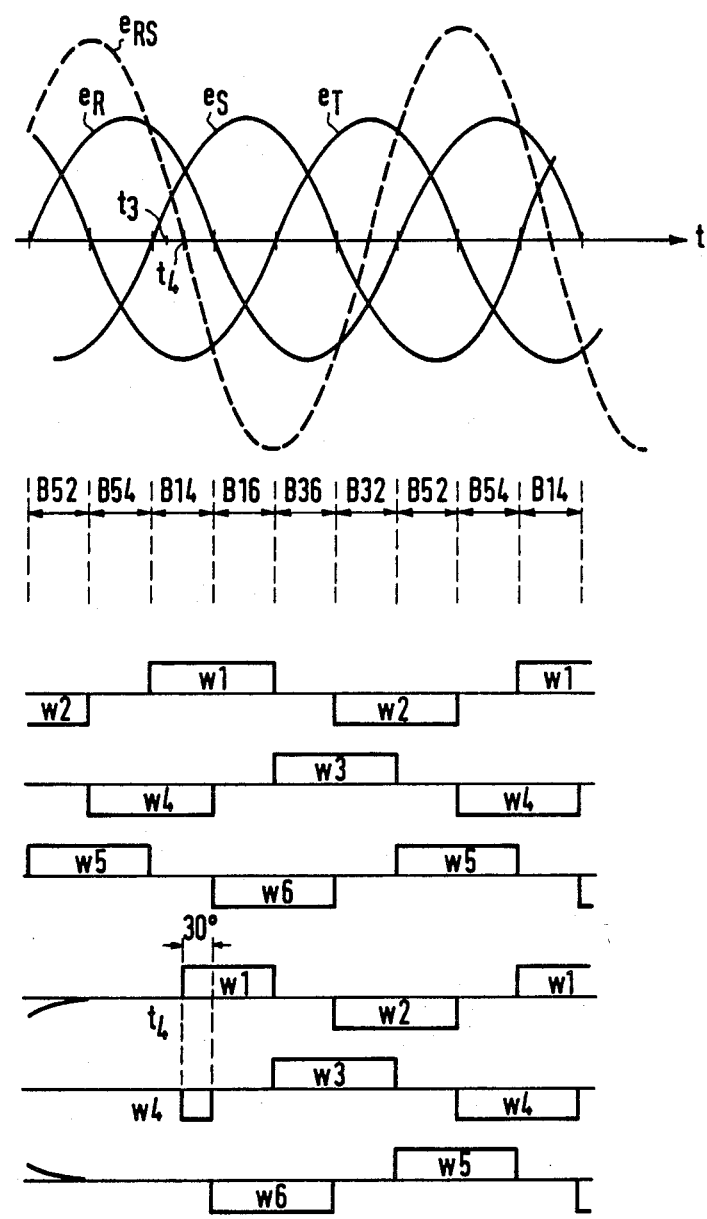
FIG. 6 is a timing diagram for signals in the circuit of FIG. 2 during the resumption of timing of the inverter portion of the circuit shown in FIGS. 1 and 2.

FIG. 2 illustrates the control of the converter and the load, asycnchronous machine ASM, the control lines for control pulses shown in FIG. 3 being indicated by the dashed lines. FIG. 4 illustrates schematically the function of the control circuit required for operation during a network failure, while FIGS. 5 and 6 show the drive pulses for the rectifier on the network side and the inverter on the machine side, respectively.

For controlling the asynchronous machine ASM via the inverter WR on the machine side which is supplied via the d-c intermediate link ZW and the rectifier GR on the network side, a control device is provided, an embodiment of which is shown in FIG. 2, and which is described, for instance, in German OS No. 29 19 852. The switch positions shown in FIG. 2 correspond to the normal operation described in this German patent publication.

In the control device shown in FIG. 2, a desired speed value $f_M{}^*$ is derived at a setting device 1, e.g., a potentiometer, and fed via a starting-up generator 2 and a comparator 3 to a speed controller 4. The output signal of the speed controller 4 represents the desired torque which, for a given flux, is proportional to the component $i_{o2}$ orthogonal to the flux ("active current") of a stator current vector. A function generator 5 forms from this active current and the magnetizing current $i_{o1}{}^*$ associated with the desired flux, the magnitude of the stator current vector which is given by $\sqrt{i_{\phi 1}{}^{*2} + i_{\phi}{}^{*2}_2}$ and is compared at a comparator 6 with the corresponding actual value of the stator current vector which can be obtained at the input, output or intermediate link of the converter. A current magnitude controller 7 forms therefrom the control angle, by which the degree of drive of the rectifier GR is set. This control angle is fed to the control unit 8 of the network-controlled converter GR, the network-synchronous reference voltage of which is furnished by a network-monitoring device 9 which monitors the state of the network. The components of the control unit 8 processing the reference frequency are as a rule integrated hardware-wise into the network monitoring device 9 and are shown in FIG. 2 only symbolically as a "synchronizing part" 8'. The control unit 8 therefore supplies the frequency $f_{GR}$ for the ignition pulses of the network-control rectifier GR, by which the amplitude of the stator current vector of the asynchronous machine is determined.

The frequency of the stator current vector, i.e., its direction in a stationary reference system referred to the stator, is given by the provision that the output variable $W^*$ of the speed controller 4 is fed, as the desired load state value, via a comparator 10 to a load state controller 11, the output signal of which is coupled to the control unit 12 of the inverter WR. The output frequency $f_M$ of this control unit 12 on the machine side determines the frequency of revolution of the stator current vector or terminal voltage, the actual frequency value and the phase being required as the reference signal for starting up the inverter after a blockage. The corresponding actual-value determining device is again subdivided symbolically into a "load determining device" 13 and a reference signal generator ("synchronizing part" 12') according to FIG. 2.

In this arrangement, a tachometer machine is not necessary if the actual speed value for the comparator 3 is obtained at the output of the controller 11.

Since the amplitude of the current is determined by the current magnitude controller 7, the direction of the stator current vector is predetermined by the load state controller 11. It is advantageous to use as the load state variable W the tangent of the "load angle", i.e., the angle between the field axis and the stator current vector. This load angle is determined by the quotient of the active current and the magnetizing current. For a constant desired flux value (i.e., constant desired magnetizing current), the desired value W* is then directly proportional to the desired torque or the desired active current developed at the controller 4. The corresponding actual value can be calculated by a load-determining device 13 from the electrical variables of the asynchronous machine.

The components of the device according to FIG. 2 described so far therefore represent the network-controlled rectifier, the d-c intermediate link and the inverter on the machine side for feeding the asynchronous machine as well as the controller required for the normal operation of the machine for an undisturbed network. In order to control the stator current, the network determining device 9 monitors the state of the network and shuts off the converter in the event of a network disturbance. For blocking the converter it is usually provided to inhibit the firing pulses for the rectifier and to cut off the inverter (this is indicated by appropriate switches 14 and 15 operated by a switching pulse C or D in the firing pulse feedlines) and to disconnect the converter via a circuit breaker 16 from the network (switching pulse B).

According to the invention, an additional current controller 20 is also provided, to the output of which is connected via a controlled switch 21 the input of the control unit 12 on the machine side during the network disturbance for controlling the frequency of the machine current. For stability of operation it is advantageous if the actual load state W is additively fed to the output signal of the supplemental current controller 20 (i.e., to the frequency reference value $f_u^*$, at which the inverter is operated during the network disturbance) via summing stage 30.

The apparatus contains switching means by which, in normal operation, the output of the supplemental current controller 20 can be separated from the control unit on the machine side (controlled double-throw switch 21, control pulse E) and can be slaved to the machine frequency. For slaving the supplemental current controller 20, its input is connected by means of a controlled double-throw switch 22 via an amplifier 23 to the output of a comparator 24, the actual value of which is obtained at the output of the controller ($f_u^*$). In order to resume the inverter timing synchronously with the machine speed, the machine speed would have to be impressed on the comparator 24. Since the resumption of the timing, however, takes place practically in the no-load condition of the machine, where the machine frequency and the machine speed are synchronous, it is sufficient to derive the machine frequency from the terminal voltages of the machine or the controlled rectifier voltages of the inverter and to feed it to the comparison point 24 as the desired value for the slaving of $f_u^*$.

The supplemental current controller 20 provides in the embodiment shown, first, that the signal $f_u^*$ is equal to the machine frequency during the undisturbed network operation. Above all, however, it ensures that $f_u^*$ is in readiness as a substitute frequency reference value which, during the network disturbance and with the inverter switched off, is equal to the machine speed, so that the controller output is at the desired frequency value required for no-load operation when the inverter is reconnected.

For reconnecting the inverter WR, the input of the supplemental current controller 20 is acted upon, by changing the double-throw switch 22 by the control deviation between a current reference value $i_u^*$ derived from the machine frequency (preferably using a function generator 28) and the actual machine current value $i_u$. The same control pulse E also switches the switch 21. If also the firing pulses for the converter WR on the machine side are provided to the inverter again by means of the firing pulse disconnect switch 15 (switching pulse D), the inverter now starts with the frequency controlled by $f_u^*$, if at the same time the machine circuit is closed by firing two series connected controlled rectifiers of rectifior GR.

The machine initially runs in no-load condition. The flux which had been decaying since the start of the converter blockage, however, is now increased again to its desired value by shifting (lowering) the inverter frequency by means of the supplemental current controller until the machine current reaches its desired value $i_u^*$ corresponding to its desired flux value. The characteristic generator 28 allows operation with a weakened field by taking back the desired flux value at high frequencies.

After the undisturbed network state has returned, the switching converter GR on the network side is reconnected to the network.

The mentioned switching pulses are generated by a switching controller 25 in cooperation with the network monitoring device 9 and the control units 8 and 12 (or their "synchronizing sections" 8' and 12'). It is the purpose of controller 25 to switch on a circuit which is separate from the network and connect the terminals of the stator winding of the asynchronous machine in such a way that the required magnetizing current can flow through the machine, for maintaining the flux in the converter by suitable firing of appropriate controlled rectifiers, if a network disturbance occurs.

Advantageously, the switching controller suppresses the transition into this disturbance operation for very short network disturbances, for instance, network disturbances shorter than 1.5 ms. With such short network disturbances, trouble in the converter and the machine need not be expected.

If a longer disturbance is detected, the switch controller first blocks the converter. This is shown in FIG. 2 by the opening of the firing pulse blocking switches 14 and 15 which symbolically show the blocking of the converter.

While advantageously the firing of the controlled rectifiers of the converter on the network side is blocked for blocking the converter (opening the switch 14 by the pulse C), it is frequently more favorable to stop only the commutating pulses for the control of the inverter on the machine side. Conventional control units contain a voltage to frequency converter, for instance, a voltage-controlled triangle generator, wherein certain oscillation states are counted by a ring counter and the ring counter controls the cyclic addressing of the controlled rectifiers. In order to stop the commutation pulses ("commutating blockage"), merely the resetting of the triangle voltage needs to be prevented, or the reading of the ring counter stopped for the duration of the commutation blockage (control signal D) which can take place without the use of a firing pulse interruption switch 15 directly in the control unit 12 or its synchronizing section 12'. With this measure, the firing pulses for the last controlled rectifiers fired before the network disturbance occurred are preserved and it is achieved thereby that the intermediate link current is broken up within a short time without excessive current peaks, and all controlled rectifiers of the converter are opened by themselves. The extinction of the intermediate link converter current need not be monitored separately; it is rather sufficient to maintain this state of the rectifier blockage and the commutation blockage at the inverter for a fixed, predetermined period of time.

Subsequently, the switching means 21, 22 are actuated by the pulse E. Simultaneously, two series-connected controlled rectifiers of the network controlled converter GR are fired ("shunt firing" represented in FIG. 2 by a separate auxiliary firing pulse line 26) and the inverter is timed again synchronously with the machine frequency. To this end, the control voltage supplied by the supplemental controller 20 is converted in the control unit 12, 12' into a pulse sequence $f_m$ starting synchronously with the machine frequency $f_u$.

Preferably, a further controlled double-throw switch 27 which is arranged between the input device 1 and the start-up generator 2 and which connects the machine frequency $f_u$ to the input of the start-up generator during the network disturbance, is operated. If the double-throw switch 27 is switched back into its original position upon the reconnection of the converter on the network side, the clock frequency is switched thereby to the actual instantaneous machine speed and is increased via the start-up generator, initially slowly, to the desired value $f_M^*$ provided for undisturbed operation. Thereby, no frequency or torque jumps are produced if the rectifier is again reconnected synchronously with the network. It may further be necessary in case the asynchronous machine can be operated in both directions of rotation, to switch the sign of the desired current value and of the actual value of the machine frequency by appropriate weighting oircuits, not shown in FIG. 2.

It also is not shown in FIG. 2 that the supply voltage of the individual sections of the electronics of the controller is advantageously furnished by a power supply which is connected to the terminal voltages of the asynchronous machine, so that the voltage supply of the controller is ensured even in the event of a network failure.

In the center of FIG. 3, various points in time are indicated on a time axis t which occur in the course of a typical network disturbance. Above this time axis, the output signal A of a comparator is shown which indicates a network failure by monitoring the voltage amplitude and/or other critical quantities of the network. Further shown above this time axis are the switching signals B to E shown in FIG. 2, while the pulses shown below the time axis are interchanged between the individual components required for the control of the method and serve for an understanding of a circuit which is shown in FIG. 4 as an example for an internal design of the control units 9 and 25.

The operation of the circuit shown in FIG. 4 now will be explained. A design corresponding to the respective requirements and the electronic components available will present no difficulties to a person skilled in the art in order to achieve the functions described in the following.

With reference to FIGS. 3 and 4, the output signal A of a comparator 40 is coupled to a network disturbance memory 42 and sets a certain amount of delay (for instance, 1.5 ms, set at the time delay stage 41) by which the occurrence and the duration of the network disturbance are stored. In the present case, the comparator 40 indicates a network disturbance (signal A) in the time interval $t_0$ to $t_5$, and in the network disturbance memory 42 a memory section 43 is set at the time $t_1$, which is reset only if at the time $t_6$ a command I for the synchronized reconnection of the network is given to the synchronizing section 8' of the converter on the network side. If no new network disturbance is present at that time, the corresponding disturbance signal B' is terminated.

The disturbance signal B is derived from the comparator signal A and indicates the start of the disturbance delayed by 1.5 ms (time $t_1$). It is indicated in FIG. 4 by an AND gate 43' that the duration of the network disturbance can also be determined by other disturbances, for the coverage of which further memory elements for other disturbance indications can be used. The output signal B may be used for opening the network switch 16 for the duration of the network disturbance.

The signal I, by which the synchronization of the control unit 8 is released, is generated by the provision that a signal H which indicates the completion of the machine-synchronized connection of the free-running inverter, is linked to a second disturbance signal B' (AND gate 45) which makes available a time delay member 44 which is likewise triggered by the disturbance signal A at the time $t_5$ (return of normal network).

The second disturbance signal B' practically represents the duration of the network disturbance set at the time delay member 44 ($t_5 - t_6 = 300$ ms). This time span $t_5 - t_6$ is chosen so that all relays and switches have responded with certainty, which are closed after the return of the network at the time $t_5$ in order to reconnect the input of the converter GR to the network. This safety time also ensures that up to the time $t_6$, network asymmetries and difficulties in determining the network frequency have decayed. The resumption of the rectifier operation then takes place not before the time $t_6$.

The network-determining device 9 further generates a third disturbance signal F that is likewise triggered at the point in time $t_1$ by the comparator output signal A and deviates only for a fixed, predetermined time interval $t_1 - t_2$ from its normal state (time delay member 46). This third disturbance signal F is used in the switch controller 25 to supply, after a time span $t_1 - t_3$ which is required for the reliable decay of the intermediate link current, a release signal G for the synchronizing unit of the converter 12. The fixed time span $t_1 - t_3$ can be predetermined by means of a time delay member 47. The synchronization section 12' of the converter on the machine side then executes, in a manner to be explained in more detail below, the resumption of the commutating clock synchronized with the machine frequency and generates at the time $t_4$ the signal H which indicates the resumed synchronized operation of the converter WR on the machine side.

From the machine synchronization execution acknowledgment signal H, the control signal I is formed, as already explained, by which the network synchronization of the rectifier is released at the time $t_6$ (then, an undisturbed network on the one hand, and on the other hand, the machine-synchronous inverter clock control is assured). If the control unit 8' has executed the synchronization of the rectifier at the time $t_7$, this is reported by an appropriate execution signal K and converted by means of a storage member 48 into a corresponding signal C which then indicates the end of the disturbed operation (which was initiated by the beginning of the signal F at the time $t_1$). This signal C and the execution signal H for the synchronization on the machine side are interlinked logically with each other by OR gate 49 and optionally with further signals which characterize the proper state of the converter and the machine, to form the signal D, by which the commutating blockage (clock blockage) of the inverter is executed during the time $t_1$ to $t_4$, and the clocked inverter operation is resumed after the time $t_4$.

The signal C also serves to obtain, by linkage with the execution signal H, the signal E, by which on the one hand, the firing of two controlled rectifiers (rectifier cross firing) which are connected in series and are provided for the disturbance operation, and the actuation of the switching means 21, 22 are performed.

Finally, a closing pulse L can be derived by means of a pulse derived from the signal K after a certain brief operating time ($t_7$ to $t_8$), by which all memories used are reset to their rest position.

In FIG. 5, the firing pulses for the controlled rectifiers of the converter on the network side are shown symbolically, where the respective firing pulses for two series-connected controlled rectifiers are shown as positive and negative pulses of a common pulse train. Each firing pulse has a length of 30° el; the duration of current conduction of the respective controlled rectifier is shown by a dashed line in the first firing pulses. Prior to time $t_1$, the rectifier operation is undisturbed, with the usual firing pulse sequence. At the time $t_1$ the firing pulses are blocked, i.e., the switch 14 is opened by means of the signal C. At the time $t_4$ the shunt pulse for the two selected series-connected controlled rectifiers, e.g., g1 and g2, is given by means of the signal E via the signal line 26. Since at this time also the clocked operation of the inverter WR is resumed, a circuit is closed thereby which leads through the stator windings of the asynchronous machine, the timed inverter controlled rectifiers and the controlled rectifiers g1 and g2. The supplemental current controller 20 ensures that the stator windings carry just that amount of current which is required for covering the electric losses of the circuit and for maintaining the desired flux. The machine is operated here slightly as a generator and the flux which has been reduced in the interval $t_1$ to $t_4$ (i.e., during the time which is required for the safe extinction of the current and for the machine-synchronous resumption of the inverter timing), is built up again to its desired magnitude. This flux build-up is accomplished at the expense of the kinematic energy of the machine which is then running with no load, and is terminated when the machine speed has dropped so far that the current necessary for maintaining the flux can no longer be supplied. In this case the converter can be shut off finally via the additional disturbance intervention in the formation of the signal D. Until then the disturbance operation (shunt-fired rectifier, clocked inverter) is maintained.

It will be assumed that the time $t_5$, at which the undisturbed network is present again, is early enough so that after the appropriate recovery time of the network switch 16, undisturbed network voltage is present again already at the rectifier (time $t_6$). The timing of the rectifier is then resumed at the time $t_7$ synchronously with the network voltage. It is advantageous for the resumption of the rectifier operation that first, a control angle of 90° is set-in by the current magnitude controller 7, corresponding to an intermediate link voltage of zero. The time $t_7$, at which therefore normal rectifier operation is resumed, is then determined from the zero crossings of the network-frequency reference frequency. It is indicated by an additional control signal at the current magnitude controller 7 that during disturbed operation, the current controller 7 is reset to the drive level zero in order to make possible frictionless, network-synchronous connection of the rectifier. Subsequently, the supplemental current magnitude signal can be increased via a starting-up generator to the degree of drive associated with $i_m{}^*$.

FIG. 6 illustrates the machine-synchronous resumption of the timing of the inverter.

First, the waveform of the Y-voltages $e_R$, $e_S$, $e_T$ and of the interlinked voltage $e_{RS}$ of the asynchronous machine is shown at the top. Below it, it is indicated how, by monitoring the interlinked voltage (terminal voltage) of the asynchronous machine, a period of machine frequency is divided into 6 partial regions where, in undisturbed operation, as the current blocks of the individual machine phases shown below, the inverter controlled rectifiers W1 and W4 or W6 are fired in the range B14 and B16; the inverter controlled rectifiers W3 and W6 or W2 in the region B36 and B32; and in the range B52 and B54, respectively, the controlled rectifiers W5 and W2 or W4 are fired.

This cyclic timing sequence is interrupted by the converter blocking device corresponding to the last three lines of FIG. 6. If therefore, the timing inhibition is applied at the time t1 in the region B52, the controlled rectifiers W5 and W2 first remain addressed; however, they are extinguished with the decay of the intermediate-link current. If now the release signal G is indicated at the synchronizing section 12' (time t3), the synchronizing section can determine the corresponding time interval, namely, the interval B14 in the example of FIG. 6. Each of these intervals contains the zero crossing of an interlinked voltage or of a controlled rectifier voltage. Therefore, the synchronizing section can now fire also the corresponding controlled rectifier connected in the conducting direction with the zero crossing of this controlled rectifier voltage (time $t_4$), i.e., in the example, the controlled rectifiers W1 and W4. Thereby the starting point for the cycle of the inverter commutation is fixed and 30° after the zero crossing of this voltage the commutation can continue in this cycle.

It is ensured thereby that the stator current vector, when connected to the machine, is synchronous with the flux and is then built up to the desired level in accordance with the starting up of the magnetizing current by the supplemental current controller 20. With this measure, the controlled rectifiers which are in the conduction direction, are fired initially, for resuming the commutation timing, at the zero crossing of an interlinked voltage adjacent to the return of the network, and 30° el after the zero crossing, commutation takes place to the controlled rectifiers following the zero crossing in the inverter cycle according to the direction of rotation of the machine in the inverter cycle.

With this method of "kinetic buffering", it is therefore possible to bridge breaks of the flux during a network disturbance, so that, with the return of the network, the build-up of the active current associated with the desired torque can be started immediately.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A method for operating an asynchronous machine coupled to an a-c supply network via an intermediate link converter in the event of a disturbance of the supply network, the converter comprising rectifier means coupled to the supply network, inverter means coupled to the asynchronous machine, said converter fired in a normal commutation cycle when there is no disturbance of the network, the inverter means and rectifier means being coupled by an intermediate d-c link, the method comprising the steps of:

inhibiting the normal commutation cycle of said converter until the current in the intermediate d-c link has decayed by inhibiting normal firing of controlled rectifiers of the rectifier means and normal firing of controlled rectifiers of said inverter means;

during the disturbance, resuming the commutation cycle of said inverter means, firing two series connected controlled rectifiers of the rectifier means coupled across the intermediate d-c link so that the asynchronous machine current is again able to flow through the intermediate d-c link and said two series-connected controlled rectifiers of the rectifier means, the frequency of the commutation cycle being slaved to a measured value of the machine frequency such that the machine current assumes a value required for maintaining a desired flux in said asynchronous machine; and after the end of the disturbance coupling said rectifier means synchronously to the network and resuming the normal commutation cycle of the rectifier means.

2. The method recited in claim 1, wherein the inhibition of said converter is maintained for a predetermined time, particularly between about 100 and 200 ms.

3. The method recited in claim 1, wherein said step of resuming the commutation cycle of said inverter means comprises the steps of firing controlled rectifiers of said inverter means disposed in a conduction direction at a zero crossing of an interlinked machine voltage, and subsequently commutating controlled rectifiers of said inverter means following this zero crossing in the normal commutation cycle of said inverter means.

4. The method recited in claim 1, wherein said step of resuming the commutation cycle of said inverter means comprises said frequency of the commutation cycle being synchronous with said measured value of the machine frequency and subsequently, being a function of a deviation between a measured machine current and a machine current reference value derived from the machine frequency.

5. The method recited in claim 1, wherein said rectifier means is coupled to said network at a drive zero level and subsequently, the current in said intermediate d-c link is increased to a value corresponding to a desired current provided for normal undisturbed operation.

6. The method recited in claim 1, further comprising the steps of comparing a desired frequency value and an actual frequency value of said asynchronous machine to form a desired value of a load state quantity, calculating an actual value of the load state quantity from electrical data of the asynchronous machine, comparing the desired and actual value of the load state quantity to form a quantity which is used as the actual frequency value and in normal operation controls the frequency of the commutation cycle of said inverter means, using the machine frequency as a frequency reference value during a network disturbance, and simultaneously with said step of coupling said rectifier means to the network, increasing said frequency reference value to an input frequency reference value provided for normal undisturbed operation.

7. The method recited in claim 1 wherein said machine frequency and said actual value of the load state quantity are derived from a terminal voltage of the machine.

8. The methdo recited in claim 1 wherein network disturbances below a predetermined minimum duration do not inhibit the converter.

9. The method recited in claim 1, further comprising the step of supplying power from a machine terminal voltage during the network disturbance.

10. The method recited in claim 1, further comprising the step of preserving the firing pulses on last-fired ones of said controlled rectifiers of said inverter means for a predetermined time when the converter is inhibited.

11. Apparatus for operating an asynchronous machine coupled to an a-c supply network via an intermediate link converter in the event of a disturbance of the supply network comprising:

rectifier means coupled to the supply network, inverter means coupled to the asynchronous machine, said inverter means and rectifier means being coupled by an intermediate d-c link;

control unit means for developing firing pulses for controlled rectifiers of said rectifier means and said inverter means;

means for monitoring the state of the supply network and for inhibiting the converter if a network disturbance occurs;

supplemental current controller means for forming a first control signal for controlling the frequency of the commutation cycle of said inverter means in the event of a network disturbance;

first switching means for disconnecting said first control signal of the supplemental current controller means from the control unit means for developing said firing pulses for said inverter means during normal operation, said first control signal being slaved to a measured machine frequency, and means coupled to an input of said supplemental current controller means for acting on said supplemental current controller means in the event of a network disturbance comprising means for generating a second control signal including function generator means for generating a current reference value from the machine frequency and means for measuring the actual value of the machine current, said second control signal being proportional to a deviation between said current reference value and said actual value, said second control signal being coupled to an input of said supplemental current controller means by second switching means, the output of said supplemental current controller means being coupled to an input of said control unit means by said first switching means in the event of a network disturbance;

third switching means for coupling firing pulses to said rectifier means and fourth switching means for coupling firing pulses to said inverter means; and switching control means for controlling said first and second switching means and said third and fourth switching means in the event of a network disturbance such that the firing pulses for said rectifier means are interrupted and the firing pulses for said inverter means remain blocked until the current in said intermediate d-c link is substantially extinguished and such that subsequently said first and second switching means are actuated and said fourth switching means is reset for normal operation and two series-connected controlled rectifiers of said rectifier means are fired, said controlled rectifiers of said inverter means being fired again in a normal commutation cycle and that after the disappearance of said disturbance on the network, said first, second and third switching means are reset for normal operation of said converter and said rectifier means is coupled to the network.

12. The apparatus recited in claim 11, wherein the polarity of the current reference value and of the machine frequency can be reversed so that the asynchronous machine can be operated in both directions of rotation.

13. The apparatus recited in claim 11 wherein said control unit means comprises current magnitude controller means for controlling said rectifier means and load-state controller means for controlling the frequency of the machine current, and further comprising speed control means for forming a third control signal from a speed reference value and an actual value of the machine speed provided at an output of said load state controller means, from which a current-magnitude reference value coupled to the current-magnitude controller means and a load-state reference value coupled to the load state controller means are derived and further comprising load-measuring means for calculating from electrical data associated with said machine the actual value of the load state, said actual value of the load state being additively superimposed on the first control signal of said supplemental current controller means.

14. The apparatus recited in claim 11, further comprising input means and secondary starting-up generator means for generating a speed reference value during undisturbed operation, and further switching means for impressing the machine frequency on an input means of said starting-up generator means during the network disturbance.

* * * * *